(12) United States Patent
Satoh et al.

(10) Patent No.: US 7,035,602 B2
(45) Date of Patent: Apr. 25, 2006

(54) HIGH-FREQUENCY COMPOSITE SWITCH COMPONENT

(75) Inventors: Yuki Satoh, Osaka (JP); Tetsuya Tsurunari, Osaka (JP); Koji Hashimoto, Hyogo (JP); Hiroshi Takahashi, Osaka (JP); Kozo Murakami, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1076 days.

(21) Appl. No.: 09/913,259

(22) PCT Filed: Dec. 14, 2000

(86) PCT No.: PCT/JP00/08859

§ 371 (c)(1),
(2), (4) Date: Nov. 30, 2001

(87) PCT Pub. No.: WO01/45285

PCT Pub. Date: Jun. 21, 2001

(65) Prior Publication Data

US 2002/0137471 A1 Sep. 26, 2002

(30) Foreign Application Priority Data

Dec. 14, 1999 (JP) ................................. 11-354302
Feb. 29, 2000 (JP) ........................... 2000-053049
Mar. 21, 2000 (JP) ........................... 2000-077605

(51) Int. Cl.
*H01Q 11/12* (2006.01)
(52) U.S. Cl. ...................................... 455/118; 455/313
(58) Field of Classification Search ................ 455/313, 455/78, 80, 83, 118, 333, 550.1, 553.1
See application file for complete search history.

(56) References Cited

U.S. PATENT DOCUMENTS

| 5,486,797 A | * | 1/1996 | Suzuki | 333/104 |
| 5,903,421 A | * | 5/1999 | Furutani et al. | 361/58 |
| 6,070,059 A | * | 5/2000 | Kato et al. | 455/78 |
| 6,236,718 B1 | * | 5/2001 | Goodman | 379/90.01 |

(Continued)

FOREIGN PATENT DOCUMENTS

EP     0 820 155 A     1/1998

(Continued)

OTHER PUBLICATIONS

Japanese language Search Report corresponding to application No. PCT/JP00/08859 dated Mar. 21, 2001.

(Continued)

*Primary Examiner*—Bing Q. Bui
(74) *Attorney, Agent, or Firm*—RatnerPrestia

(57) ABSTRACT

A hybrid radio frequency (RF) switching device includes first to fourth ports, a diode coupled between the first port and second port, a first transmission line having a length of $\lambda g/4$ (where $\lambda g$ is a wave length of a frequency in a first frequency band), and a first element coupled in series with the first transmission line having an almost simple reactance component and nearly opening in a second frequency band. The first transmission line and first element are coupled in series between the second port and third port. The device further includes a second transmission line having a length of $\lambda d/4$ (where $\lambda d$ is a wavelength of a frequency in the second frequency band), and a second element having an almost simple reactance component and nearly opening in the first frequency band. The second transmission line and second element are coupled in series between the second port and fourth port.

22 Claims, 12 Drawing Sheets

U.S. PATENT DOCUMENTS 6,580,902 B1 * 6/2003 Sorrells et al. ............. 455/333

FOREIGN PATENT DOCUMENTS

| EP | 0 928 038 A | 7/1999 |
| --- | --- | --- |
| GB | 2 333 669 A | 7/1999 |
| JP | 6-77707 | 3/1994 |
| JP | 7-202505 | 8/1995 |
| JP | 7-226607 | 8/1995 |
| JP | 10-303697 | 11/1998 |
| JP | 11-251957 | 9/1999 |
| JP | 11 340872 | 12/1999 |
| JP | 2000-156651 | 6/2000 |
| JP | 2000-165288 | 6/2000 |
| JP | 2000-188522 | 7/2000 |
| JP | 2000-286609 | 10/2000 |

OTHER PUBLICATIONS

English translation of Form PCT/ISA/210.
European Search Report for EP 00 98 1719, dated May 7, 2004.

* cited by examiner

M1
M1 = -24.338E+00 dB
I1 = 925.00E+06 Hz

M2
M2 = -24.470E+00 dB
I1 = 960.00E+06 Hz

M3
M3 = -25.424E+00 dB
I1 = 1.8050E+09 Hz

M4
M4 = -25.139E+00 dB
I1 = 1.8800E+09 Hz

HIGH-FREQUENCY COMPOSITE SWITCH COMPONENT

THIS APPLICATION IS A U.S. NATIONAL PHASE APPLICATION OF PCT INTERNATIONAL APPLICATION PCT/JP00/08859.

FIELD OF THE INVENTION

The present invention relates to a radio frequency (RF) switching device, which is provided mainly in a mobile communication apparatus such as mobile phone, in which a switching circuit for switching between a transmitting and a receiving and a branching circuit for branching different transmitting/receiving bands, a low-pass filter at the transmitting side, and a band pass filter at the receiving side are hybridized.

BACKGROUND OF THE INVENTION

Recently, a switch duplexer having a small size and high performance is demanded increasingly for use in mobile phone. A conventional circuit configuration of an conventional switch duplexer for dual bands is shown in FIG. 14. A circuit configuration of the switch duplexer in a composite terminal for mobile phone systems called GSM in a 900 MHz band and DCS in a 1.8 GHz band, both of which are in service in Europe at present time.

In the diagram, reference numerals 1001 to 1005 denote input/output ports, reference numerals 1006 and 1007 denote control terminals, reference numerals 1008 to 1011 denote diodes, reference numerals 1012 and 1013 denote transmission lines, reference numerals 1014 and 1015 denote band-pass filters (BPFs), and reference numeral 1016 denotes a diplexer. Diplexer 1016 is generally composed of circuits combined with low-pass filter (LPF) 1016a and high-pass filter (HPF) 1016b.

In this circuit configuration, an antenna (not shown) is connected to input/output port 1005, and the signal received by the antenna is first distributed into GSM signal and DCS signal by diplexer 1016. The length of transmission lines 1012 and 1013 are set at one-quarter wavelength for the frequency bands of GSM and DCS, respectively. When a positive voltage is applied to the control terminal 1006 where a current flows accordingly, diodes 1008 and 1010 are turned on, and ports 1005 and 1001 are thus coupled each other. Similarly, when a positive voltage is applied to the control terminal 1007 where a current flows accordingly, diodes 1009 and 1011 are turned on, and ports 1005 and 1003 are thus coupled. If a voltage is not applied to control terminals 1006 or 1007, diodes 1008 to 1011 are turned off, and ports 1005 and 1002 are thus disconnected, and ports 1005 and 1004 are thus disconnected.

Ports 1001 and 1003 operate as transmission ports (Tx). BPFs 1014 and 1015 operates as filters for limiting a receiving bandwidth. Ports 1002 and 1004 operates as reception ports (Rx).

In such conventional configuration, four diodes are required. Since having larger sizes than other circuit components such as L and C, the diodes have not been integrated into a laminated body, and thus the device is hardly reduced in size. The diodes are more expensive than the other circuit components and thus increases the cost of the device. Besides, the switch duplexer for both GSM and DCS requires a couple of transmission lines 1012 and 1013, which also have the duplexer hardly reduced in size.

SUMMARY OF THE INVENTION

The invention is intended to solve the problem, and it is hence an object thereof to provide a hybrid radio frequency (RF) switching device with a small size and high performance which including fewer diodes.

To achieve the object, the device of the invention includes:

first to fourth ports;

a diode connected between the first and second ports, a first transmission line having a line length of $\lambda g/4 \times n$, $\lambda g$ being a wavelength of a frequency in the first frequency band, n being an odd number of 1 or larger;

a first element coupled between the second and third ports in series with the first element, the first element having an impedance containing a nearly simple reactance component at the second frequency band;

a second element coupled at a coupling position where the first element having a nearly open impedance at the second frequency band, the second element having an impedance containing a nearly simple reactance component; and a reactance circuit or a second transmission line, the reactance circuit being coupled in parallel with the second element, the second transmission line being coupled in series with the second element, the second element having an open impedance as seen from the coupling position at the first frequency band. That provides a small-sized hybrid RF switching device having a simple structure and exhibiting a high performance

DESCRIPTION OF THE PREFERRED EMBODIMENTS

Embodiment 1

Embodiment 1 of the present invention will be explained below while referring to accompanying drawings.

Figure 1:
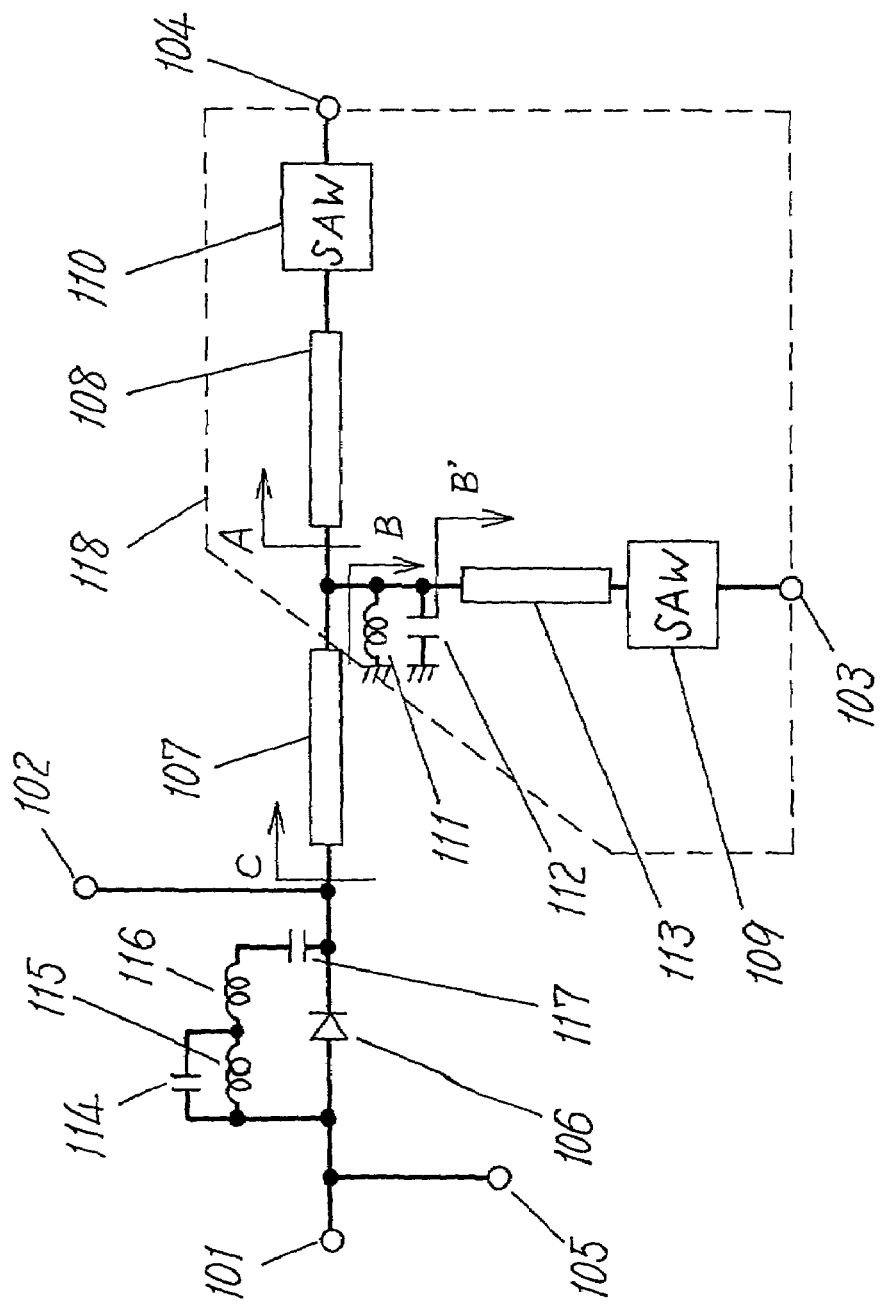
FIG. 1 is a circuit diagram of a hybrid radio frequency (RF) switching device according to embodiment 1 of the present invention.

FIG. 1 is a circuit diagram of a hybrid radio frequency (RF) switching device according to embodiment 1 of the invention. Reference numerals 101, 102, 103, and 104 denote input/output ports. Reference numeral 105 denotes a control terminal. Reference numerals 106 denotes a diode. Reference numerals 107, 108, and 113 denote transmission lines. Reference numerals 109 and 110 denote surface acoustic wave (SAW) filters. Reference numerals 111, 115, and 116 denote inductors. Reference numerals 112, 114, and 117 denote capacitors, and reference numeral 118 denotes a branching circuit.

In this embodiment, for an easily-understandable explanation, frequencies are defined as follows.

A signal component from the port 101 to the port 102: 880–915 MHz and 1710–1785 MHz (hereinafter called transmission bands)

A signal component from the port 102 to the port 104: 925–960 MHz (hereinafter called a first reception band)

A signal component from the port 102 to the port 103: 1805–1880 MHz (hereinafter called a second reception band)

A frequency in the second reception band is about twice the pass-band frequency of the SAW filter 110, and hence the absolute value of a reflection coefficient at the input terminal of the SAW filter 110 is close to 1. Accordingly, in this embodiment, the transmission line 108 is connected, and the impedance from a point A toward the right side in the diagram in the second band is set to a nearly open.

A frequency in the first reception band is about a half of that of a pass band of the SAW filter 109, and hence the absolute value of a reflection coefficient at the input terminal of the SAW filter 109 is close to 1. Accordingly, in this embodiment, transmission line 113, an inductor 111 and capacitor 112 are connected as shown in the diagram, the impedance from a point B toward the bottom side in the diagram in the first band is set to a nearly open.

In other words, a composite impedance of the inductor 111 and capacitor 112 in the first band and an impedance from a point B' toward the bottom side in the diagram in the first band parallel-resonate. Further, as a technique for avoiding an adverse influence on the pass-band characteristic in the second band, herein, the inductor 111 and capacitor 112 parallel-resonating in the second band are employed.

In such configuration, a circuit block 118 operates as a branching circuit. Further, the SAW filters 109 and 110 present a steep attenuation characteristic.

Figure 2:
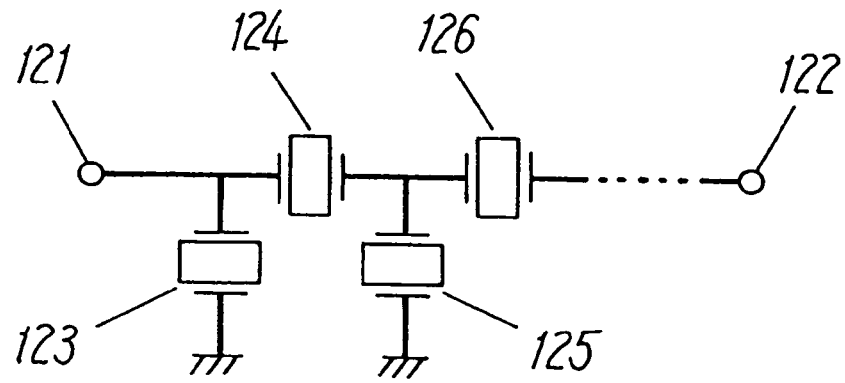
FIG. 2 is a circuit diagram of a surface acoustic wave (SAW) filter according to the embodiment.

FIG. 2 is a circuit configuration diagram of the SAW filter in FIG. 1. Reference numeral 121 denotes an input terminal. Reference numeral 122 denotes an output terminal. Reference numerals 123 to 126 denote resonance elements of the SAW filter. In the SAW filters 109 and 110 in FIG. 1, the first resonance element is connected in shunt to a ground at the input terminal as shown in FIG. 2, and thus, an input impedance at input terminal 121 becomes a short-circuit in the transmission band.

Referring to FIG. 1, when transmitting by turning on diode 106, it is preferable that an impedance from a point C toward the right side is set to an open-circuit in the transmission band. For this purpose, in this embodiment, a total line length of transmission lines 107 and 108 is set to $\lambda g/4$ at a frequency in 880–915 MHz band, where $\lambda g$ is a wavelength corresponding to the frequency. On the other hand, as explained above, an impedance from a point B toward bottom side is set to a nearly open-circuit, and thus the circuit operates preferably in the 880–915 MHz band.

An impedance from a point A toward the right side is set to a nearly open-circuit by the same reason. A total line length of transmission lines 107 and 113 of $\lambda d/4$ at a frequency in a 1710–1785 MHz band, where $\lambda d$ is a wavelength corresponding to the frequency, provides an impedance from a point C toward the right side in the diagram with a nearly open-circuit in a 1710–1785 MHz band. And ports 101 and 102 are accordingly coupled.

In the embodiment, transmission line 113 may be either a transmission line having a positive length or a transmission line having a negative length. The transmission line having the negative length can be equivalently provided by a $\pi$-form or T-form circuit (a high pass filter) in which an inductor is connected in shunt, and a capacitor connected in series.

The transmission lines 107, 108, and 113 may be converted into an equivalent lumped constant circuit, instead of distributed constant circuit such as transmission lines. In such a case, the circuit including the inductor 111 and capacitor 112 can be combined and simplified, and the dimension of the circuit can be reduced.

Further, a circuit composed of the inductors 115, 116 and capacitor 114 can parallel-resonate together with a capacitance between the terminals of the diode 106 where a current is turned off in the first and second reception band. Therefore, an isolation between the ports 101 and 102 is assured when the current is turned off and can reduce the adverse influence to other pass-band characteristics.

Figure 3:
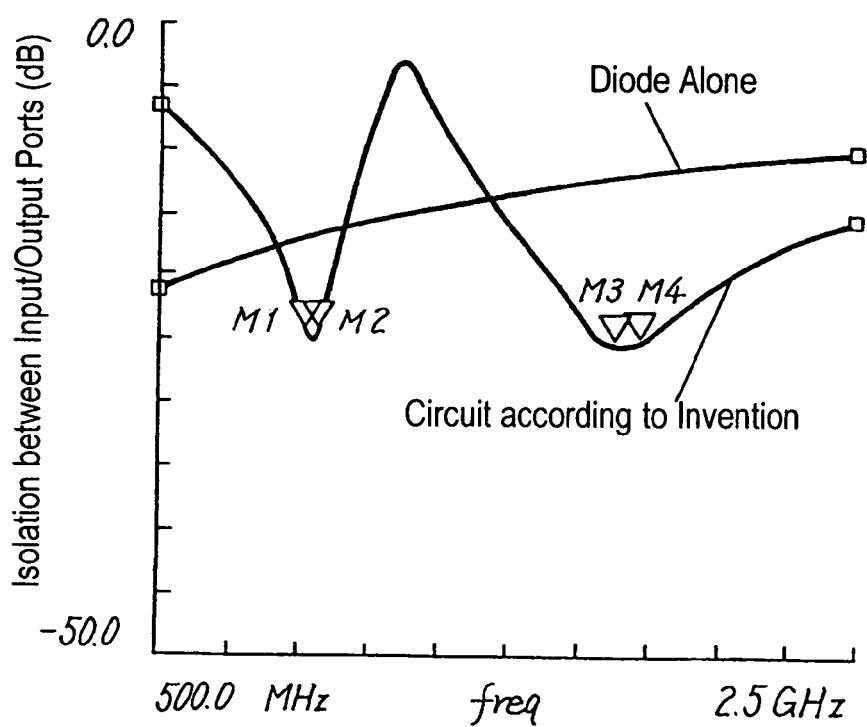
FIG. 3 is a characteristic diagram of an isolation between input and output ports according to the embodiment.

FIG. 3 shows an isolation characteristic between the ports 101 and 102 under a condition that the capacity between the terminals of the diode 106 is about 0.27 pF, and the values of the inductors 115, 116 and capacitors 114, 117 are 12 nH, 39 nH, 1.9 pF, and 15 pF, respectively. That provides a more favorable characteristic than the case of the diode 106 alone.

The transmission line 107 consists of a microstrip line, a strip line, or an equivalent circuit consisting of a capacitor connected in shunt and an inductor connected in series. And the inductor 111 connected as shown in the diagram guides the current flowing out from the control terminal 105 to the ground, and has any particular choke inductor connected to the ground unnecessary.

The circuit shown in FIG. 1 can be formed into a laminated body having plural dielectric sheets. At the moment, the diode 106 and SAW filters 109 and 110 can be mounted on the laminated body, and the transmission lines 107, 108, and 113, inductors 111, 115, and 116, and capacitors 112, 114, and 117 can be formed in the laminated body. Then, circuit dimensions can be substantially reduced as compared with a flat structure forming the same circuit on a substrate.

Thus, according to the embodiment, the circuit includes only one diode. Contrary to a circuit having four large, expensive diodes required in the prior art, a small, inexpensive hybrid RF switching device can be provided. A part of the circuit of this hybrid RF switching device can be used as a branching circuit. Moreover, a circuit coupled to the port 101 for combining and branching signals in 900 MHz band and 1.8 GHz band provides transmission ports for the respective bands.

Embodiment 2

Embodiment 2 of the invention will be explained below by referring to the drawings.

Figure 4:
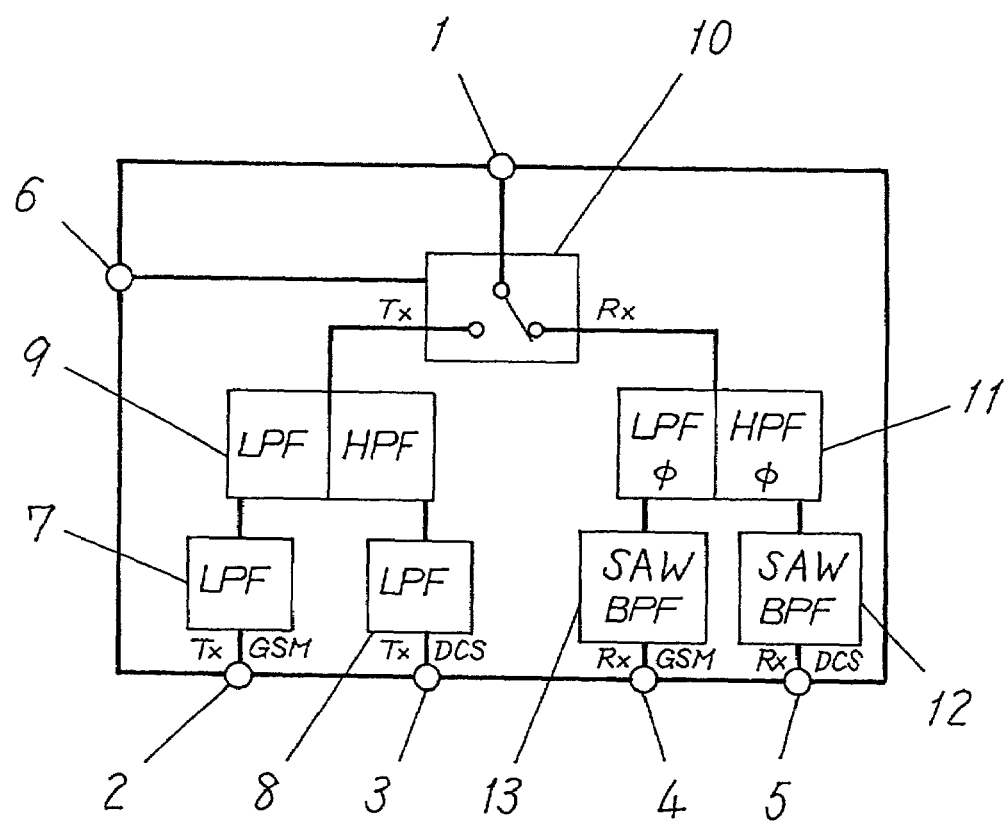
FIG. 4 is a circuit block diagram showing a schematic configuration of a hybrid RF switching device according to embodiment 2 of the present invention.

FIG. 4 is a block diagram showing a schematic configuration of a hybrid radio frequency (RF) switching device according to embodiment 2 of the present invention.

In this embodiment, an input/output port 1 is a common port for inputting and outputting an RF signal. A frequency is set as follows.

A signal component delivered from an input/output port 2 to the port 1: 880–915 MHz (hereinafter called a first transmission band)

A signal component delivered from an input/output port 3 to the port 1: 1710–1785 MHz (hereinafter called a second transmission band)

A signal component delivered from the port 1 to an input/output port 4: 925–960 MHz (hereinafter called a first reception band)

A signal component delivered from the port 1 to an input/output port 5: 1805–1880 MH (hereinafter called a second reception band)

In FIG. 4, a switch 10 switches between a transmitting and receiving. A transmission signal from the ports 2 and 3 are combined and divided into the first and the second transmission bands in a diplexer 9. Low-pass filters (LPFs) 7 and 8 are provided in respective routes. At an receiving side, a signal is branched into the first and the second reception bands by a diplexer 11 having a phase-shifting function. Surface acoustic wave (SAW) filters 13 and 12 are provided in respective routes. The switch 10 is controlled through a control terminal 6.

Figure 5:
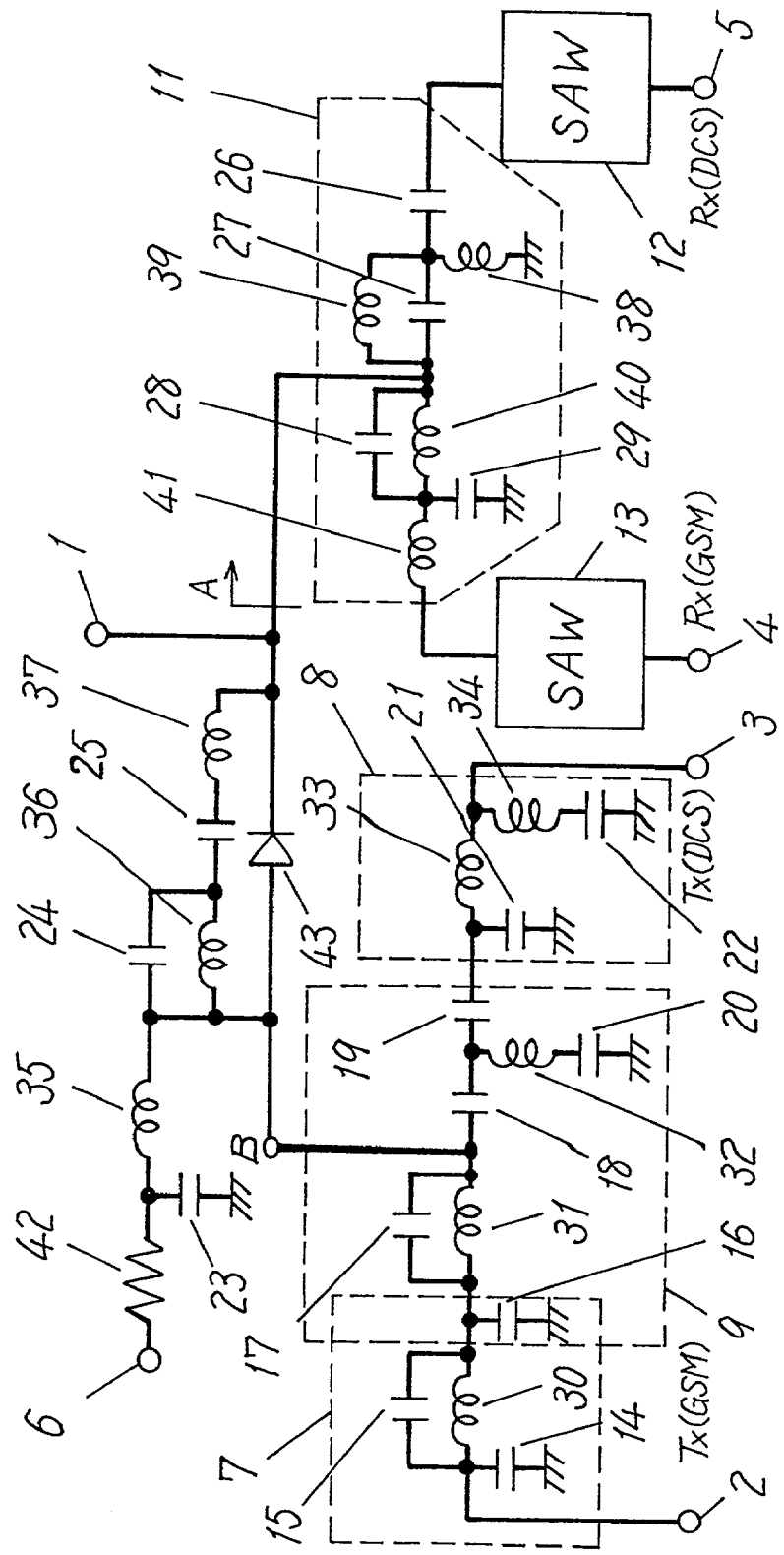
FIG. 5 is a specific circuit configuration of the block diagram shown in FIG. 4.

FIG. 5 shows a specific circuit configuration of the block diagram in FIG. 4. In FIG. 5, reference numerals 14 to 29 denote capacitors, reference numerals 30 to 41 denote inductors, reference numeral 42 denotes a current control resistor, and reference numeral 43 denotes a diode for composing the switch 10 in F*ig*.4. The capacitors 14 to 16 and inductor 30 compose the LPF 7, and the capacitors 21 and 22 and inductors 33 and 34 compose the LPF 8. The capacitors 16 to 19 and inductors 31 and 32 compose the diplexer 9. The capacitors 26 to 29 and inductors 38 to 41 compose the diplexer 11 with a phase shifting function.

Component values are determined so that a parallel resonance circuit consisting of the capacitor 17 and inductor 31 may resonate nearly in the second transmission band, and a series resonance circuit consisting of the inductor 32 and capacitor 20 may resonate nearly in the first transmission band.

Component values are determined so that a parallel resonance circuit consisting of the capacitor 27 and inductor 39, and a parallel resonance circuit consisting of the capacitor 28 and inductor 40 may resonate nearly in the first and second reception bands, respectively.

Each SAW filters 12 and 13 has an input impedance of a nearly short-circuit in each transmission band in a relation of frequencies mentioned above. A phase rotation of the input impedance of each SAW filters 12 and 13 can compose the switch 10 having an impedance from the port 1 toward the right side local-maximum.

That is, the capacitors 26 and 27 and inductors 38 and 39 operate as a phase shifter functioning equivalently as a T-form high-pass filter in the second reception band. Further, component values are determined so that the SAW filter 12 may have the input impedance rotate on a Smith chart to have the impedance almost maximum in the second transmission band.

On the other hand, the capacitors 28 and 29 and inductors 40 and 41 similarly operate as a phase shifter functioning equivalently as a T-form high-pass filter in the first reception band. Further, component values are determined so that the SAW filter 13 may have the input impedance rotate on a Smith chart to have the input impedance almost maximum in the first transmission band.

In such configuration, in the first transmission band and second transmission band, since the impedance from the port 1 toward the receiving circuit side is almost maximum, the switch 10 for switching between a transmitting and receiving can be composed with the diode 43.

A circuit consisting of the capacitors 24 and 25 and inductors 36 and 37 cancels the capacitance of the diode 43 turned off in the first and second reception bands. The inductor 35 is a choke inductor, and the capacitor 23 is a bypass capacitor.

The SAW filters 12 and 13, each particularly consisting of a ladder-type filter as shown in FIG. 2, can steeply attenuate in a vicinity of the pass-band. And each filter, upon particularly having a shunt resonator at an input stage, has a reflection coefficient of which absolute value is close to 1, so that it is more preferable.

That is, a resonance element 123 at the first stage placed closely at the input terminal 121 is connected in shunt to the ground, and has the series resonance frequency set in the transmission band or the vicinity. Therefore, the input impedance at input terminal 121 is set almost to a short-circuit in both the first and second transmission bands.

Therefore, in FIG. 5, during a transmitting with the diode 43 turned on, an impedance from a point A toward the right side in each transmission band may be set at an open-circuit. Accordingly, in this embodiment, the T-form circuit consisting of the inductors 40 and 41 and capacitors 28 and 29 has an equivalent electric length of $\lambda g/4$ at a frequency in the first transmission band, where $\lambda g$ is a wavelength corresponding to the frequency. According to this setting, the SAW filter 13 has the input impedance set at a nearly short-circuit in the first transmission band. Therefore, an impedance from a point A toward the right side in the first transmission band is set at an open-circuit by the reason explained above, so that a desired operation is realized.

In the second transmission band, similarly, the SAW filter 12 has the input impedance set at an almost short-circuit. The T-form circuit consisting of the inductors 38 and 39 and capacitors 26 and 27, upon having the equivalent electric length of $\lambda d/4$, makes an impedance from a point A toward the right side in the diagram become a nearly open-circuit. (where $\lambda d$ is a wavelength corresponding to the frequency.) As a result, in the first and second transmission bands, the diode 43, upon being turned on, couples the port 2 with the port 1 or couples the port 3 with the port 1 without a signal leakage to the ports 4 and 5 through the SAW filters 12 and 13.

According to this embodiment, the SAW filters 12 and 13 provide steep attenuation characteristics, and can function sufficiently even in the present frequency relation.

Further, according to the embodiment, a current for switching the diode 43 is supplied from the control terminal 6 to the ground through the diode 43, inductors 39 and 38, that is, a current path is established, and therefore, a choke inductor or the like is not particularly needed.

Instead of the T-form circuit consisting of the inductors 40, 41 and capacitors 28, 29, and instead of the T-form circuit consisting of the inductors 38, 39 and capacitors 26, 27 in the embodiment, a three-element T-form or π-form phase shifter which is equivalently expressed as an lumped constant circuit may be combined with a distributed constant circuit.

The circuit composed of the inductors 36, 37 and capacitor 24 may parallel-resonate in the first and second reception bands together with a capacitance between the terminals of the diode 43 where a current is turned off. Thus, the circuit can isolate the port 1 and a point B securely when the current is turned off, and reduce an adverse influence to other pass-band characteristics.

For example, under the condition that the capacitance between the terminals of diode 43 is 0.4 pF, and the inductors 36, 37 and capacitors 24, 25 are 12.26 nH, 27 nH, 1.52 pF, and 33 pF, respectively, an isolation characteristic between the port 1 and point B is shown in FIG. 3. A more favorable characteristic is obtained as compared with the case of the diode alone.

The circuit shown in FIG. 5 can be formed in a laminated body having plural dielectric sheets. At the moment, the diode 43 and SAW filters 12, 13 can be mounted on the laminated body, and the inductors and capacitors can be formed in the laminated body. And thus, they can be composed integrally, and have circuit size much reduced as compared with a flat structure forming the same circuit on a substrate.

According to the embodiment, the circuit includes only one diode. Contrary to the circuit including four large, expensive diodes required in the prior art, a small, inexpensive hybrid RF switching device can be provided.

Embodiment 3

Embodiment 3 of the present invention will be explained below by referring to the drawings.

In embodiment 3, a circuit of embodiment 2 is partially modified, and thus, modified portion will be mainly explained. The same parts as in embodiment 2 are denoted by the same reference numerals, and their explanation is omitted.

Figure 6:
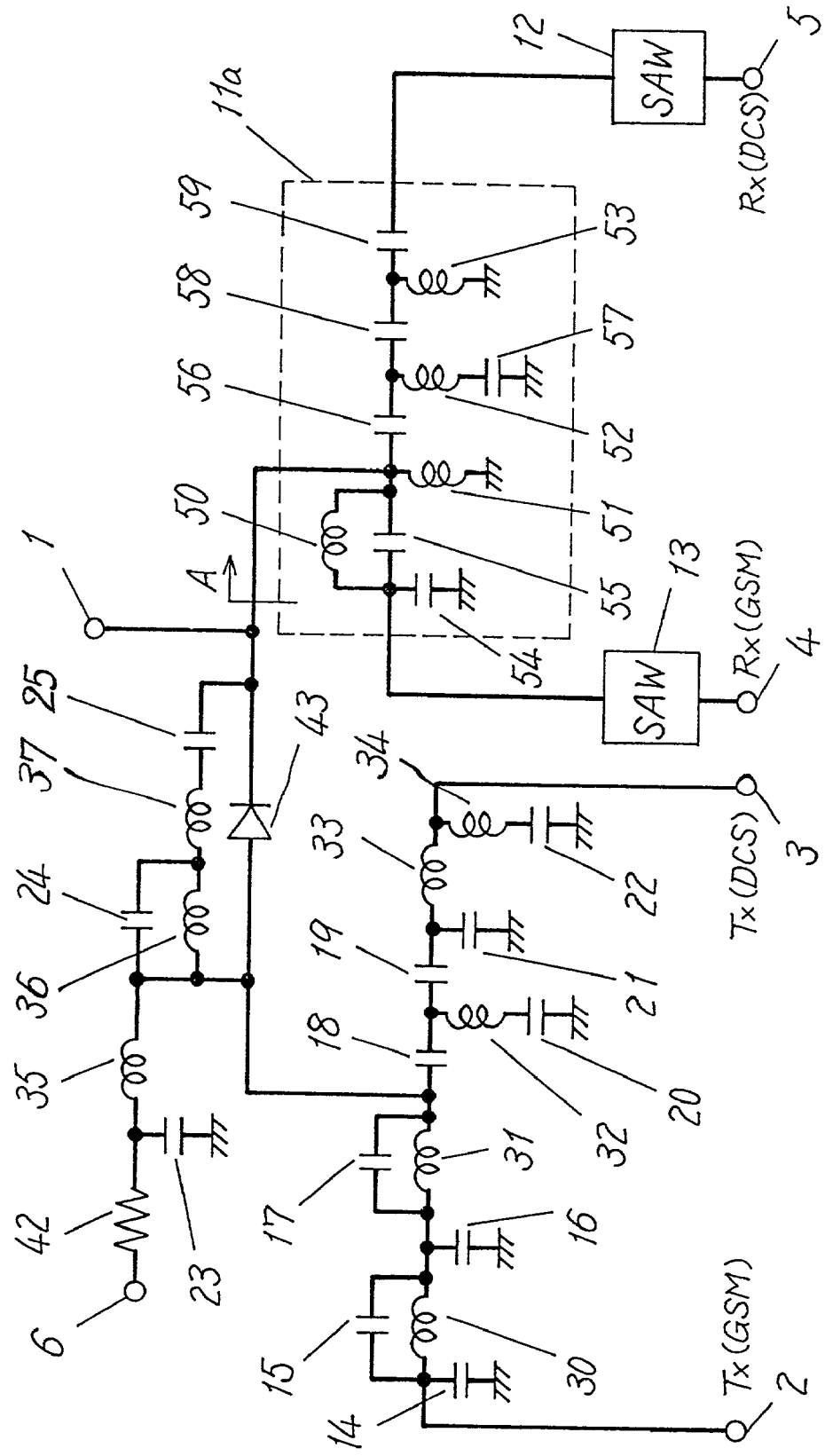
FIG. 6 is another specific circuit configuration of the block diagram shown in FIG. 4 according to embodiment 3 of the present invention.

FIG. 6 shows a specific circuit configuration of the block diagram of FIG. 4, similarly to embodiment 2. In the diagram, reference numerals 50 to 53 denote inductors, and reference numerals 54 to 59 denote capacitors. They form a diplexer 11a as shown in FIG. 6.

In diplexer 11a, a resonance frequency of a parallel circuit composed of inductor 50 and capacitor 55 is set to the second transmission band and second reception band or the vicinity. And a resonance frequency of a series circuit composed of inductor 52 and capacitor 57 is set to the first transmission band and first reception band or the vicinity. In the first transmission band, a phase shifter shifting a phase by λg/4 with a desired characteristic impedance (usually 50Ω) is formed in a π-form circuit between the SAW filter 13 and the port 1. The π-form circuit includes C (the capacitor 56)-L (a combined impedance of the inductor 50 and capacitor 55)-C (the capacitor 54). In the second transmission band, a phase shifter shifting a phase by −λg/4 with a desired characteristic impedance (usually 50Ω) is formed in a circuit between the SAW filter 12 and the port 1. The circuit includes C (the capacitor 56)-L (a combined impedance of the inductor 52 and capacitor 57)-C (the capacitor 58)-L (the inductor 53)-C (the capacitor 59). The inductor 51 is a choke inductor for feeding a control current to the diode 43.

According to this setting, as explained in embodiment 2 of the invention, the SAW filter 13 has an input impedance set at a short-circuit in the first transmission band, and the SAW filter 12 has an impedance set at a short-circuit in the second transmission band. Therefore, an impedance from a point A toward the right side is set at an open-circuit in the first and second transmission bands, so that a desired operation of this embodiment may be provided.

In the embodiment, the circuit composed of the inductors 50 to 53 and capacitors 54 to 59 may be equivalently provided by a distributed constant circuit or may be partly combined with a distributed constant circuit.

The SAW filters 12 and 13, each particularly consisting of a ladder-type filter as shown in FIG. 2, can steeply attenuate a vicinity of the pass-band. And each filter, upon particularly having a shunt resonator at the first stage, has a reflection coefficient of which absolute value is close to 1, so that it is more preferable.

The circuit shown in FIG. 6 can be formed in a laminated body having plural dielectric sheets. At the moment, the diode 43 and SAW filters 12 and 13 are mounted on the laminated body, and the inductors and capacitors can be formed in the laminated body. And thus, they can be composed integrally, and have circuit size much reduced as compared with a flat structure forming the same circuit on a substrate.

According to the embodiment, the circuit includes only one diode. Contrary to the circuit including four large, expensive diodes required in the prior art, a small, inexpensive hybrid radio frequency (RF) switching device can be provided.

Embodiment 4

Embodiment 4 of the invention will be explained below by referring to the drawings.

In embodiment 4, a circuit of embodiment 2 is partly modified, and thus, modified portion will be mainly explained. The same parts as in embodiment 2 are denoted by the same reference numerals, and the explanation is omitted.

Figure 7:
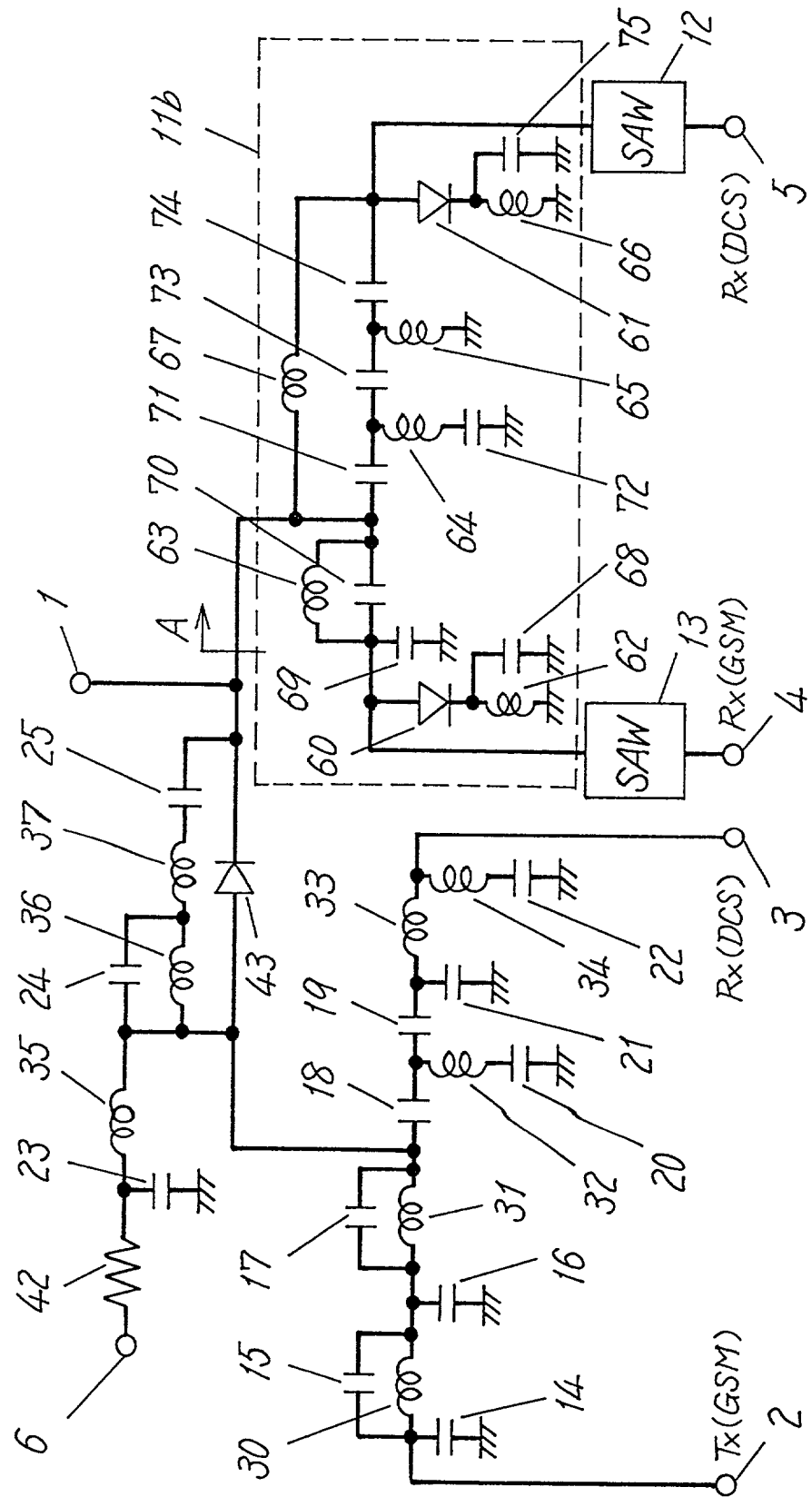
FIG. 7 is further specific circuit configuration of the block diagram shown in FIG. 4 according to embodiment 4 of the present invention.

FIG. 7 shows a specific circuit configuration of the block diagram of FIG. 4, similarly to embodiments 2 and 3. In the diagram, reference numerals 60 and 61 denote diodes. Reference numerals 62 to 67 denote inductors. Reference numerals 68 to 75 denote capacitors. They form a diplexer 11b as shown in FIG. 6.

A basic operation of the diplexer 11b is the same as that explained in embodiment 3 of the invention, and thus, omitted herein. In this embodiment, the diodes 60 and 61 are grounded with capacitor 68 and 75. They consequently provides an ideal short-circuit when the diodes 60 and 61 are turned on with a current through them. That is, the diodes turned on have inductive components, and thus the capacitors 68 and 75 have capacitances selected so as to cancel the inductive components in the first and second transmission bands, respectively. The inductors 62, 66, and 67 are choke inductors.

According to this setting, as explained in embodiments 2 and 3 of the invention, the SAW filter 13 has an input impedance set at an almost short-circuit in the first transmission band, and the SAW filter 12 has an impedance set at an almost short-circuit in the second transmission band. Therefore, an impedance from a point A toward the right side become an open-circuit, so that a desired operation may be provided in the first transmission band and second transmission band.

Circuit components other than the diodes 60 and 61 for composing the diplexer 11b may be equivalently provided by a distributed constant circuit or a partial combination of a distributed constant circuit.

The circuit shown in FIG. 7 can be formed in a laminated body having plural dielectric sheets. At the moment, the diodes 43, 60 and 61 and SAW filters 12 and 13 can be mounted on the laminated body, and the inductors and capacitors are formed in the laminated body. And thus, they can be composed integrally, and have circuit size much reduced as compared with a flat structure forming the same circuit on a substrate.

According to the embodiment, the circuit includes three diodes. Contrary to the circuit including four large, expensive diodes required in the prior art, a small, inexpensive hybrid radio frequency (RF) switching device can be provided.

Embodiment 5

By applying the foregoing embodiments 2 to 4, a hybrid radio frequency (RF) switching device applicable to triple bands including, for example, GSM (900 MHz)/DCS (1.8 GHz) in Europe and PCS (1.9 GHz) in the U.S.

Figure 8:
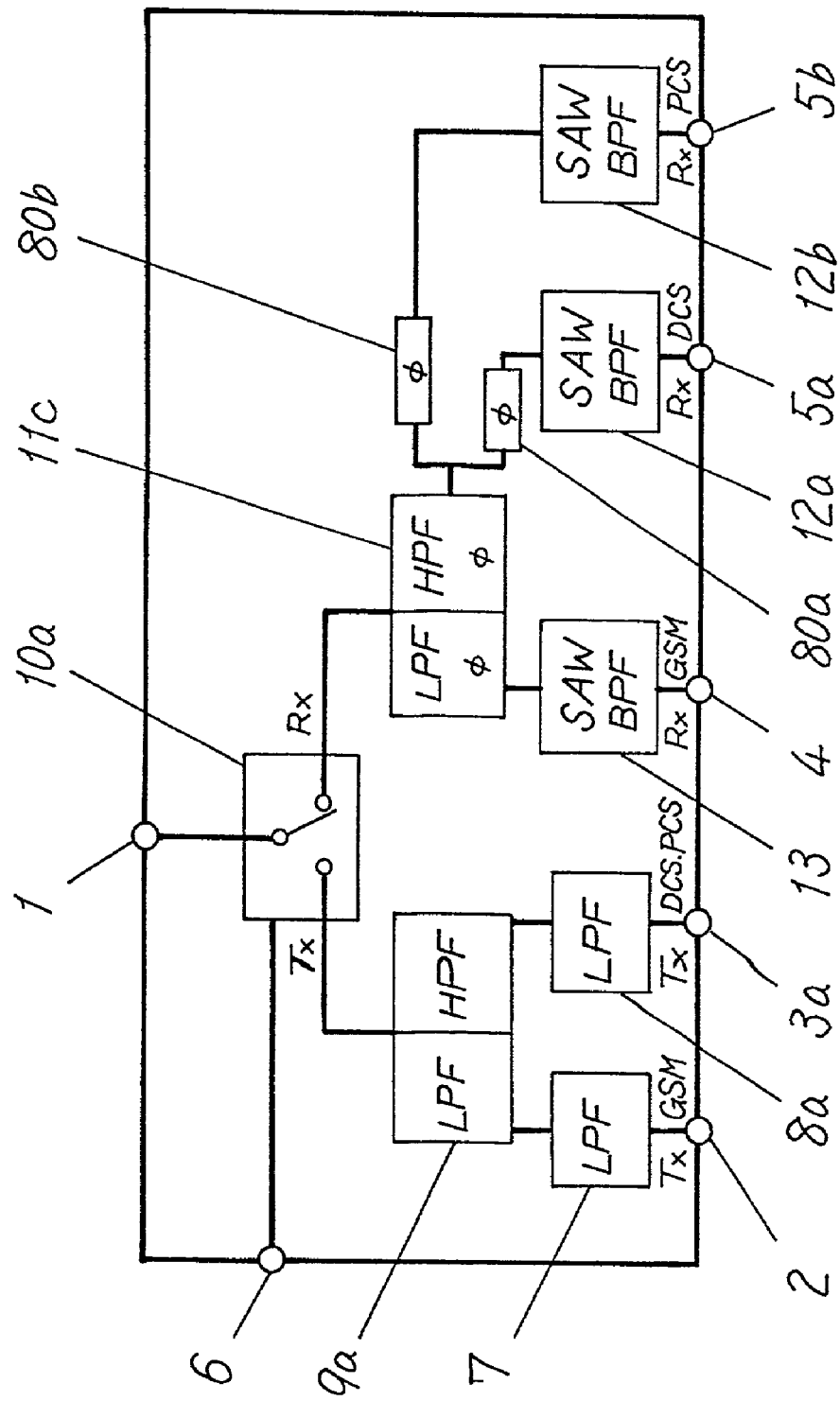
FIG. 8 is a circuit block diagram showing a schematic configuration of a hybrid RF switching device according to embodiment 5 of the present invention.

FIG. 8 is a block diagram showing a schematic configuration of a hybrid RF switching device according to embodiment 5 of the invention. The block diagram in FIG. 8 is a modified one in FIG. 4. The same parts are denoted by the same reference numerals, and the explanation is omitted.

The DCS (1.8 GHz) and PCS (1.9 GHz) are close to each other, and thus, signals in them are driven by a common power amplifier. Therefore, in the diagram shown in FIG. 8, for transmission, the device has two systems, a DCS-PCS system and a GSM system. In a reception side, the device includes surface acoustic wave (SAW) filters 12a, 12b and transmission lines 80a, 80b to function as a switch.

That is, a switch 10a switches between transmission and reception. At a transmission side, signals in GSM and DCS-PCS bands are combined by diplexer 9a through low-pass filters (LPFs) 7 and 8a, respectively. At a reception side, a diplexer 11c having a phase shifting function roughly branches a signal into the GSM band and DCS-PCS band. Then, a signal in the DCS-PCS band are branched into the DCS band and PCS band through the transmission lines 80a, 80b, respectively. The SAW filters 12a, 12b are provided in the signal paths. The switch 10a is controlled through a control terminal 6.

Figure 9:
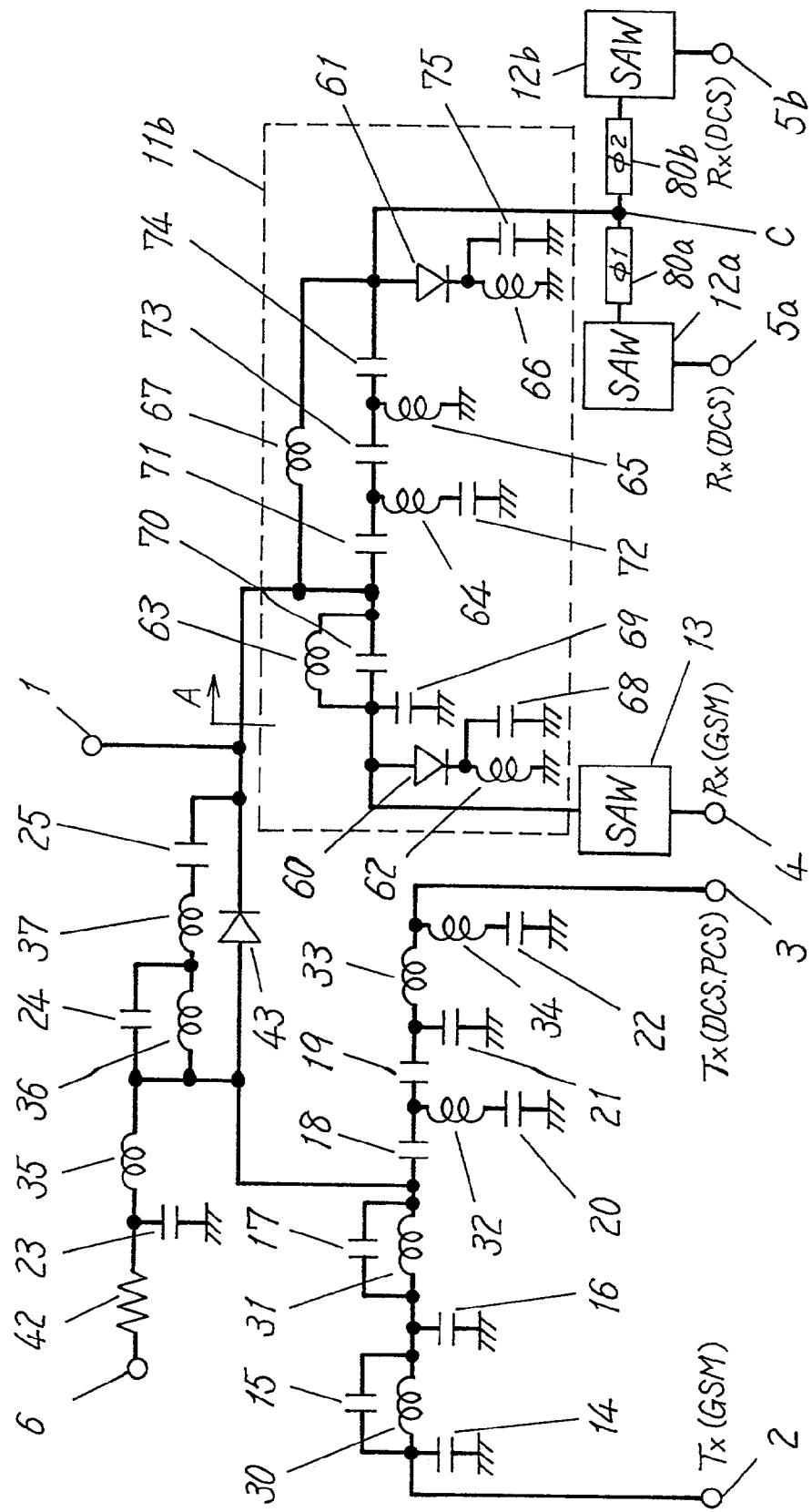
FIG. 9 is a specific circuit configuration of the block diagram shown in FIG. 8 according to embodiment 5 of the present invention.

FIG. 9 shows a specific circuit configuration of the block diagram in FIG. 8. The circuit in FIG. 9, which is based on that in FIG. 7, has basically the same structure and just has different component values are different. Therefore, the same parts are denoted by the same reference numerals, and the explanation is omitted.

The circuit in FIG. 9 includes a further SAW filter, the transmission lines 80a and 80b for branching a signal into the reception bands, DCS and PCS, and treat the second transmission band of 1710–1910 MHz (hereinafter called a third transmission band), and the second reception band of 1805–1990 MHz (hereinafter called a third reception band), which differs from the circuit in FIG. 7

Reference numeral 12a denotes a SAW filter for a DCS reception band, and reference numeral 12b denotes a SAW filters for a PCS reception band. In the DCS (1805–1880 MHz) reception band and the PCS (1930–1990 MHz) reception band, each transmission lines 80a and 80b has an electric length setting an impedance from a point C toward the opposite side (i.e., toward the SAW filter 12b in the DCS reception band) to an open-circuit. Further, considering a phase rotation in the circuit including the capacitors 71 to 74, inductors 64 and 65, and impedances of the diode 61, inductor 66 and capacitor 75, an impedance from a point A toward the right side is set to an open-circuit in the third transmission band when the diode 61 is turned on.

In this configuration, a desired operation may be realized.

The circuit shown in FIG. 9 can be formed in a laminated body having plural dielectric sheets. At the moment, the diodes 43, 60 and 61 and SAW filters 12a, 12b and 13 can be mounted on the laminated body, and the inductors and capacitors are formed in the laminated body. And thus, they can be composed integrally and have circuit size much reduced as compared with a flat structure forming the same circuit on a substrate.

According to the embodiment, a hybrid RF switching device applicable to triple bands can be provided which has a simple circuit configuration.

Embodiment 6

Embodiment 6 of the invention will be explained below by referring to the drawings.

Figure 10:
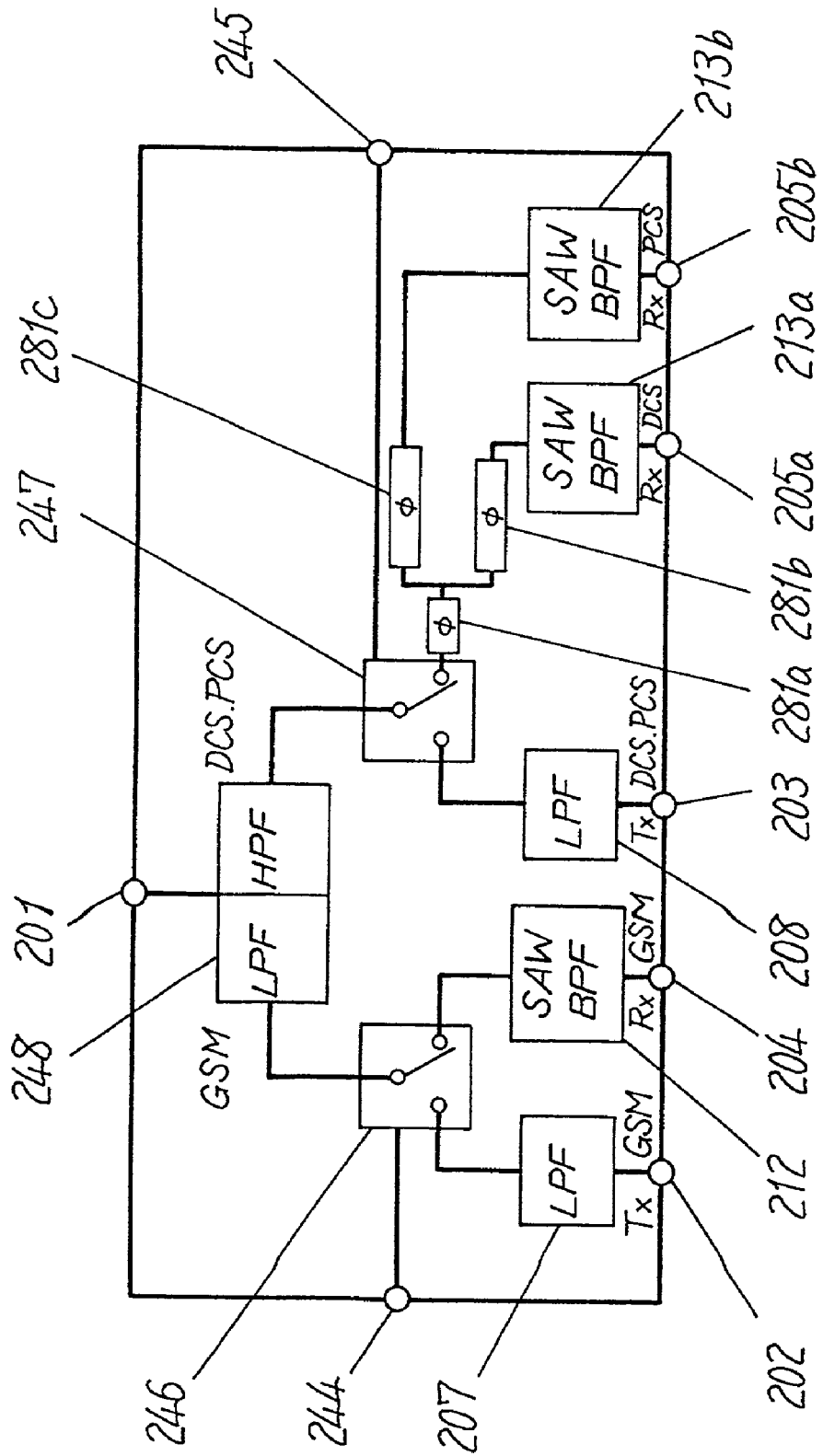
FIG. 10 is a circuit block diagram showing a schematic configuration of a hybrid RF switching device according to embodiment 6 of the present invention.

FIG. 10 is a block diagram of a hybrid radio frequency (RF) switching device according to embodiment 6 of the invention. Reference numerals 201, 202, 203, 204, 205a, and 205b denote input/output ports. Reference numeral 207 and 208 denote low-pass filters (LPFs). Reference numerals 212a, 213a, and 213b denote surface acoustic wave (SAW) filters. Reference numerals 244 and 245 denote control terminals. Reference numeral 248 denotes a diplexer composed of an LPF and high-pass filter (HPF). Reference numerals 246 and 247 denote switches. Reference numerals 281a, 281b, and 281c are transmission lines.

In the diagram, for transmission, signals in DCS (1.8 GHz) and PCS (1.9 GHz) bands which are close to each other are driven by a common power amplifier, and thus the device has two system, a DCS-PCS system and GSM system. In a receiving side, the device has the SAW filters 213a and 213b, and the transmission lines 281a, 281b and 281c to function as a switch, and thus the device includes three systems, the GSM, DCS, and PCS systems.

That is, the diplexer 248 roughly branches and combines signals into a GSM band and DCS-PCS band. A signal in the GSM band is further branched into the transmission band and reception band by the switch 246. The LPF is connected at the transmission side, while the SAW filter 212 is connected at the reception side.

The DCS-PCS band is also branched into the transmission band and the reception band by the switch 247. The LPF 208 is coupled at the transmission side, while the reception side is further branched into DCS and PCS bands through transmission lines 281a, 281b, and 281c to function as switch. The SAW filters 213a and 213b are coupled in respective paths. The switches 246 and 247 are controlled through control terminals 244 and 245.

Figure 11:
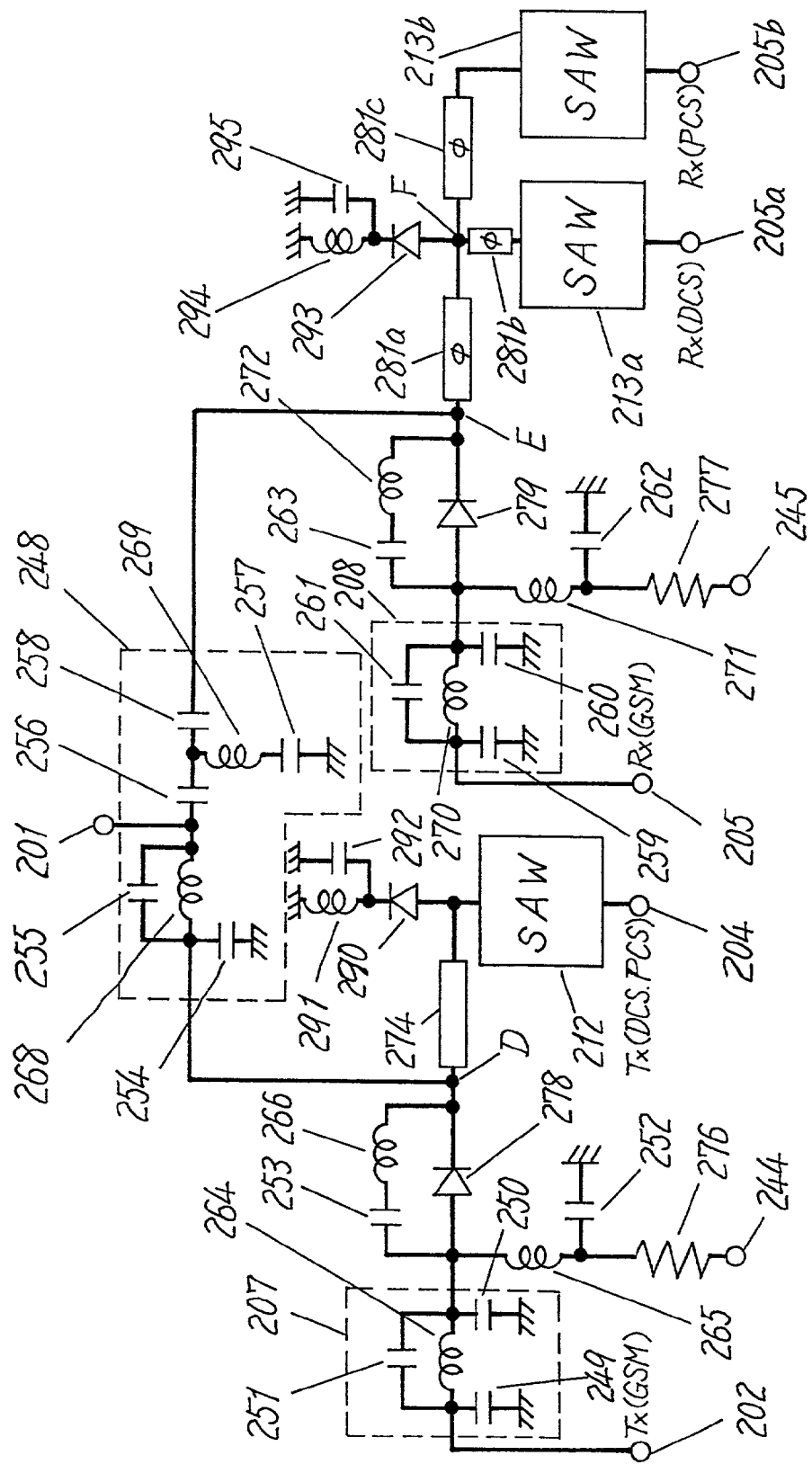
FIG. 11 is a specific circuit configuration of the block diagram shown in FIG. 10.

FIG. 11 shows a specific circuit configuration of the block diagram in FIG. 10. In the diagram, reference numerals 249 to 263 denote capacitors. Reference numerals 264 to 273 denote inductors. Reference numerals 276 and 277 denote current control resistors. Reference numeral 278 denotes a diode for composing the switch 246 in FIG. 10, and reference numeral 279 denotes a diode for composing the switch 247 in FIG. 10. Capacitors 249 to 251 and inductor 264 compose the LPF 207, and capacitors 259 to 261 and inductor 270 compose the LPF 208. Further, capacitors 254 to 258 and inductors 268 and 269 compose the diplexer 248.

Reference numeral 213a denotes a SAW filter for a DCS reception, and reference numeral 213b denotes a SAW filter for a PCS reception. In a DCS reception band (1805–1880 MHz) and PCS reception band (1930–1990 MHz), each transmission lines 281b and 281c has an electric length setting an impedance from a point F toward the opposite side (i.e., toward the SAW filter 213b in the DCS reception band) to an open-circuit.

Further, transmission lines 274 and 281a have electrical lengths of one-quarter wavelength in the first and third transmission bands, respectively. Therefore both an impedance from a point D toward the right side and an impedance from a point E toward the right side are set to an open-circuit in the first and third transmission bands, respectively, when the diodes 278, 279, 290 and 293 are turned on.

In this configuration, a desired operation may be provided.

The circuit shown in FIG. 11 can be formed in a laminated body having plural dielectric sheets. At the moment, the diodes 278, 279, 290, and 293 and the SAW filters 212, 213a, and 213b can be mounted on the laminated body, and the inductors and capacitors can be formed in the laminated body. And thus, they can be composed integrally, and have circuit size much reduced as compared with a flat structure forming the same circuit on a substrate.

Incidentally, the circuit composed of inductor 291, capacitor 292 and diode 290, and the circuit composed of inductor 294, capacitor 295, and diode 293 may be replaced by one simple inductor only by properly setting the component values so as to satisfy the individual relations described above, so that the circuit configuration using only two diodes can be realized.

According to the embodiment, a hybrid RF switching device applicable to triple bands can be provided, which has a simple circuit configuration.

Embodiment 7

Embodiment 7 of the invention will be explained below by referring to the drawings. Embodiment 7 shows a one-chip configuration of the hybrid radio frequency (RF) switching device according to the foregoing embodiments 1 to 6.

Figure 12:
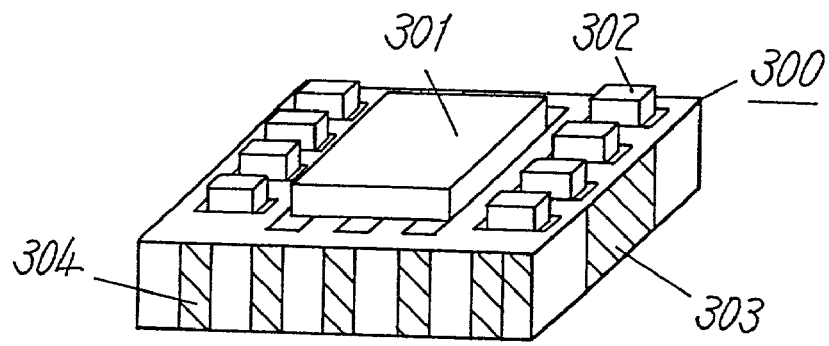
FIG. 12 is a perspective view showing a schematic configuration of a hybrid RF switching device according to embodiment 7 of the present invention.

FIG. 12 is a perspective view showing a schematic configuration of a hybrid RF switching device according to embodiment 7 of the invention. Reference numeral 300 denotes a laminated body formed by laminating plural dielectric sheets each having a relatively low dielectric constant (about $\epsilon r<10$). In laminated body 300, branching circuits, low-pass filters (LPFs), and a part of switching circuits are formed. On the laminated body 300, chip components 302, e.g. diodes, chip inductors and other, and a surface acoustic wave (SAW) filter 301 are mounted. They compose a one-chip hybrid RF switching module.

That is, in laminated body 300, inductors for composing circuits are formed as electrode patterns such as meander patterns or spiral patterns, and each capacitor is composed of a pair of electrodes. An input/output electrode 304 and a ground electrode 303 are formed at the side of the laminated body 300. The SAW filter 301 is mounted on the laminated body 300 by a wire bonding or flip-chip mounting to reduce the size.

The chip components 302, e.g. the diodes for composing switches and chip inductors used as choke inductors, may not be formed in the laminated body 300. Even if they can be formed, they have so large values that they hardly get small, thus are mounted on the laminated body 300. Therefore, elements that cannot be formed in the laminated body 300, components having too large values to be reduced in size even if being formed, and components that is hardly protected against noise may be mounted on the laminated body 300. That provides a one-chip structure and reduces the total dimension.

Although not shown in the diagram, a metal cap grounded electrically for covering the surface of the laminated body 300 protects the module from an external electromagnetic interference. A bare chip and resin-molded chip of the diode can be mounted as a chip component 302

A specific structure of the laminated body 300 will be explained by referring to FIG. 13.

Figure 13:
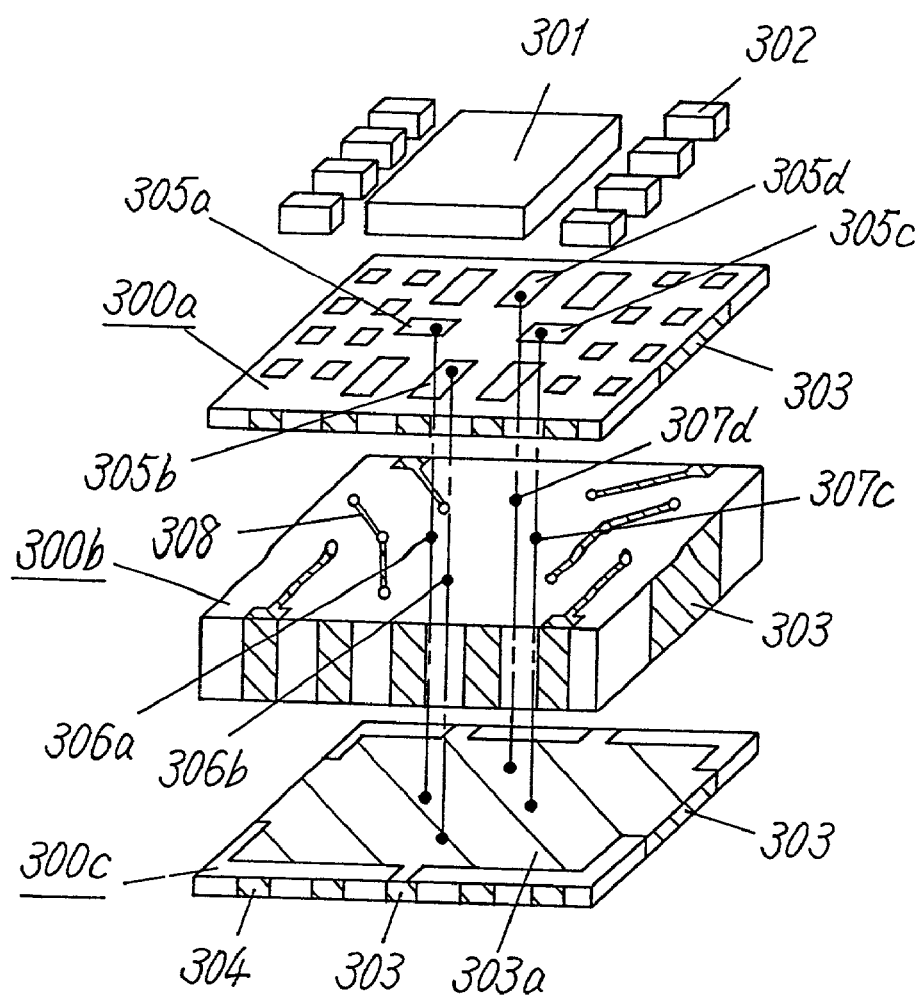
FIG. 13 is a perspective exploded view of the device according to the embodiment.
Figure 14:
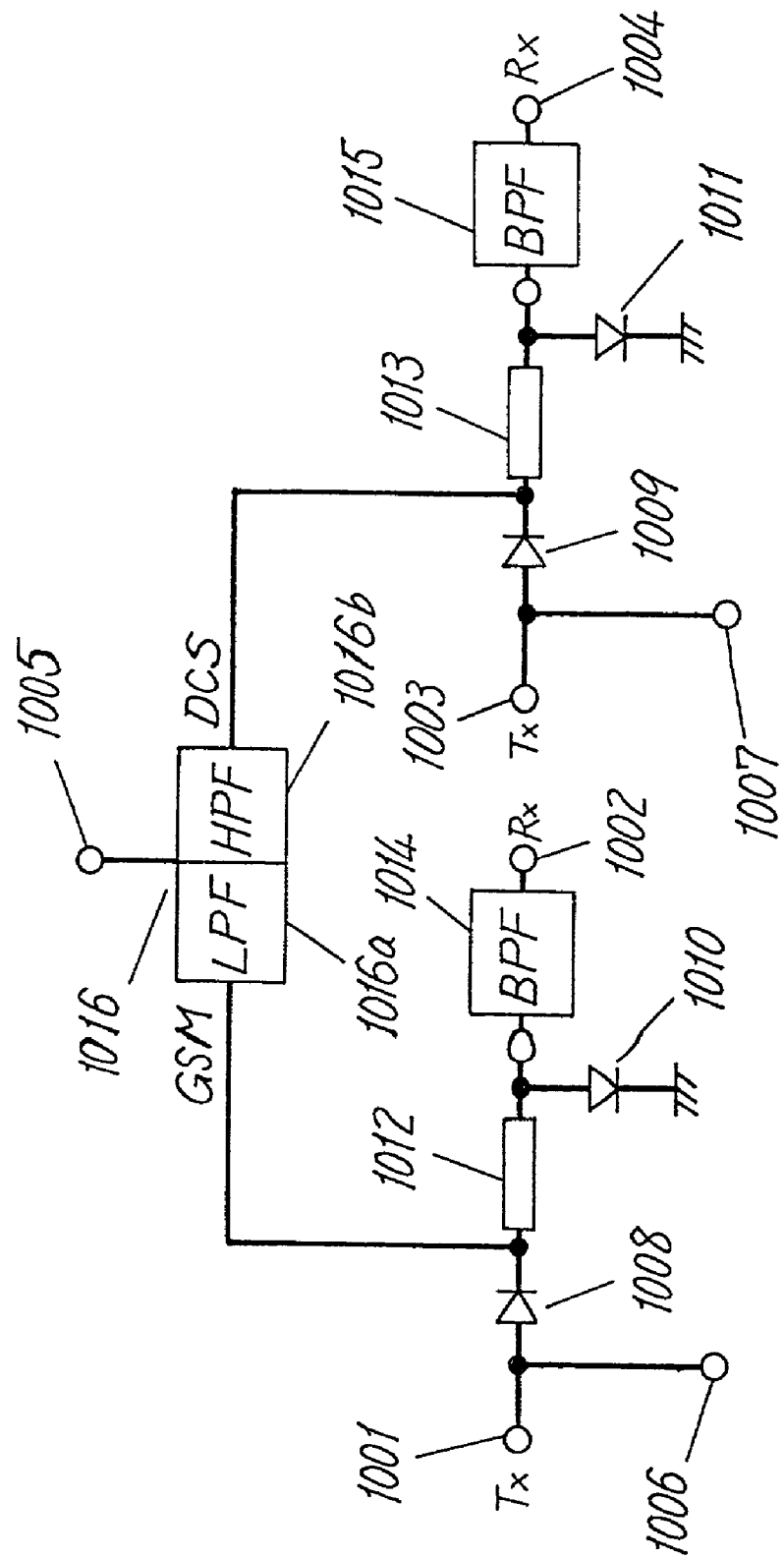
FIG. 14 is a circuit block diagram showing a schematic configuration of a conventional switch duplexer.

FIG. 13 is a perspective exploded view of FIG. 12, in which reference numerals 300a to 300c denote three sheets formed from the body 300 arbitrarily divided into three, and reference numerals 305a to 305d denote grounding terminals for mounting the SAW filter 301. Grounding terminals 305a to 305d are directly connected to a ground electrode 303a formed on sheet 300c through via-holes 306a–306d in the sheet 300a and 300b, respectively. This configuration reduces a parasitic inductance between the ground and each SAW resonators 123 and 125 as shown in FIG. 2, and thus decreases a downward shift of a series-resonance frequency of each SAW resonators 123 and 125. As a result, the SAW filter 301 has a characteristic in which a frequency shift of a lower-side attenuation pole decreases, so that a deterioration of an attenuation amount can be reduced.

Although not shown, the ground electrode 303a formed close to the bottom, upon being formed a layer close to the top surface of the laminated body 300, has the length of each via-holes 306a–306d shortened. That decreases the parasitic inductance and the deterioration of the attenuation amount of the SAW filter 301 more effectively.

Further, plural via-holes connecting the ground electrode 303a to each of grounding terminals 305a to 305d for the respective grounding terminal further decreases the parasitic inductance and the deterioration of the attenuation amount of the SAW filter 301.

INDUSTRIAL APPLICABILITY

As clear from the above description, according to the invention, a hybrid radio frequency (RF) switching device including fewer diodes and having a smaller size and a higher performance is provided. The device is sufficiently applicable to multiple bands such as dual bands and triple bands despite the very simple structure.

The invention claimed is:

1. A hybrid radio frequency (RF) switching device for switching RF signals in a first frequency band and a second frequency band being higher than the first frequency band, the hybrid RF switching device comprising:
   first to fourth ports for at least one of inputting and outputting the RF signals;
   a diode coupled between the first and second ports;
   a first transmission line having an electrical line length of $\lambda g/4 \times n$, $\lambda g$ being a wavelength of a frequency in the first frequency band, n being an odd number of 1 or larger;
   a first element coupled between the second and third ports in series with the first transmission line, the first element having an impedance that is substantially reactive in the second frequency band;

a second element coupled at a coupling position where the first element having a nearly open impedance in the second frequency band, the second element having an impedance that is substantially reactive in the first frequency band;

a second transmission line coupled at the coupling position in series with the second element, the second transmission line having an open impedance as seen from the coupling position in the first frequency band; and a reactance circuit coupled between the coupling position and a ground.

2. A hybrid RF switching device of claim 1, wherein the first and second elements include surface acoustic wave (SAW) filters, respectively.

3. A hybrid RF switching device of claim 2, wherein the SAW filters include ladder type filter circuits, respectively.

4. A hybrid RF switching device of claim 3, wherein each of the ladder type filter circuits includes a SAW wave resonance element at a first stage coupled in shunt between the first transmission line and a ground, the first and second elements passing higher portions in the first frequency band and second frequency band, respectively.

5. A hybrid RF switching device of claim 1, wherein at least one of the first and second transmission line includes a concentration constant circuit.

6. A hybrid RF switching device of claim 1,
wherein the reactance circuit comprises a parallel circuit in which an inductor and capacitor are coupled in parallel,
wherein the inductor and capacitor parallel-resonate in the second frequency band, and
wherein the inductor, capacitor, and second element resonate in the first frequency band.

7. A hybrid RF switching device of claim 6, wherein the first and second transmission lines are composed of microstrip lines or strip lines, and the inductor in the reactance circuit is coupled directly between the first and second transmission lines and the ground.

8. A hybrid RF switching device of claim 1, further comprising a circuit coupled in parallel with the diode, the circuit including:
a first inductor;
a second inductor coupled in series with the first inductor;
a capacitor coupled in parallel with the first inductor; and
a DC cutting capacitor coupled in series with the first inductor,
wherein a circuit network including the first inductor, the second inductor, the capacitor, and a capacitor between terminals of the diode turned off parallel-resonate in the first frequency band and second frequency band.

9. A hybrid radio frequency (RF) switching device for switching RF signals in a first frequency band, a second frequency band being higher than the first frequency band, a third frequency band near the first frequency band, and a fourth frequency band near the second frequency band, the hybrid RF switching device comprising:
first to fourth ports for at least one of inputting and outputting the RF signals;
a diode coupled between the first and second ports;
a first resonance circuit parallel-resonating to have a local maximum impedance in the first and third frequency bands, and having a capacitive impedance in the second frequency band;
a first inductor coupled in shunt between the first resonance circuit and a ground;

a first capacitor coupled in series with the first resonance circuit, the first capacitor, first inductor, and first resonance circuit being coupled in a T-form;
a first surface acoustic wave (SAW) filter coupled between the first capacitor and the third port, the first SAW filter passing the second frequency band;
a second resonance circuit parallel-resonating to have a local maximum impedance in the second and fourth frequency bands, and having an inductive impedance in the first frequency band;
a second capacitor coupled in shunt between the second resonance circuit and the ground;
a second inductor coupled in series with the second resonance circuit, the second inductor, second capacitor, and second resonance circuit being coupled in a T-form; and
a second SAW filter coupled between the second inductor and the fourth port, the second SAW filter passing the first frequency band,
wherein the first resonance circuit and second resonance circuit are coupled to the second port through the diode.

10. A hybrid RF switching device of claim 9, wherein the first SAW filter comprises:
an input terminal opposite to a side coupled to the third port; and
a SAW resonator disposed at a first stage from the input terminal and coupled to the ground in parallel, the SAW resonator series-resonating in the fourth frequency band.

11. A hybrid RF switching device of claim 9, wherein the second SAW filter comprises:
an input terminal opposite to a side coupled to the fourth port; and
a SAW resonator disposed at a first stage from the input terminal and coupled to the ground in parallel, the SAW resonator series-resonating in the third frequency band.

12. A hybrid RF switching device of claim 10, wherein a circuit in which the first resonance circuit, the first inductor coupled in shunt between the first resonance circuit and the ground, and the first capacitor coupled in series with the first resonance circuit are coupled in the T-form has an equivalent electric length of $\lambda d/4 + \lambda d \times n$ in the fourth frequency band, $\lambda d$ being a wavelength in the fourth frequency band, n being an integer).

13. A hybrid RF switching device of claim 11, wherein a circuit in which the second resonance circuit, the second capacitor coupled in shunt between the second resonance circuit and the ground, and the second inductor coupled in series with the second resonance circuit are coupled in the T-form has an equivalent electric length of $\lambda g/4 + \lambda g \times n$ in the third frequency band, $\lambda g$ being a wavelength in the third frequency band, n being an integer.

14. A hybrid RF switching device 9, wherein a frequency in the second frequency band is about twice a frequency in the first frequency band.

15. A hybrid RF switching device of claim 9, further comprising a circuit coupled in parallel with the diode, the circuit including:
a third inductor;
a fourth inductor coupled in series with the third inductor;
a third capacitor coupled in parallel with the third inductor; and
a DC cutting capacitor coupled in series with the third inductor,
wherein a circuit network having a capacitance between terminals of the diode turned off, the third inductor, fourth inductor, and third capacitor parallel-resonates in the first and third frequency bands and the second and fourth frequency bands.

16. A hybrid radio frequency (RF) switching device for switching RF signals in a first frequency band, a second frequency band being higher than the first frequency band, a third frequency band near the first frequency band, and a fourth frequency band near the second frequency band, the first and second frequency bands being included in a first frequency band group, the third and fourth frequency bands being included in a second frequency band group, the hybrid RF switching device comprising:
   a common port for inputting and outputting the RF signals;
   a switch for switching the first and second frequency band groups, the switch being coupled at a first stage from the common port;
   a first diplexer for dividing the first and second frequency bands;
   a second diplexer for dividing the third and fourth frequency bands;
   first and second low-pass filters (LPFs) coupled with the first and second diplexers, respectively, the first and second LPFs corresponding to the first and second frequency bands, respectively;
   first and second ports coupled with the first and second diplexers through the first and second LPFs, respectively;
   first and second surface acoustic wave (SAW) filters coupled with the first and second diplexers, respectively, the first and second SAW filters passing the third and fourth frequency bands included in the second frequency band group, respectively;
   third and fourth ports coupled with the first and second diplexers through the first and second SAW filters, respectively;
   a laminating body including a dielectric sheet laminated therein; and
   a diode included in the switch,
   wherein the laminating body includes the switch except the diode, the first and second diplexers, and the first and second LPFs formed therein, and includes the diode and the first and second SAW filters mounted thereon.

17. A hybrid RF switching device of claim 16, wherein a frequency in the second frequency band is about twice a frequency in the first frequency band.

18. A hybrid radio frequency (RF) switching device for switching RF signals in a first frequency band, second and third frequency bands close to each other being higher than the first frequency band, a fourth frequency band near the first frequency band, and fifth and sixth frequency bands near the second and third frequency bands, the first, second and third frequency bands being included in a first frequency band group, the fourth, fifth, and sixth frequency bands being included in a second frequency band group, the hybrid RF switching device comprising:
   a common port for inputting and outputting the RF signals;
   a switch for switching the first and second frequency band groups, the switch being disposed at a first stage from the common port;
   a first diplexer dividing the first, second, and third frequency bands included in the first frequency band group;
   a second diplexer dividing the third, fourth, and fifth frequency bands included in the second frequency band group;
   a first low-pass filter (LPF) corresponding to the first frequency band, being coupled with the first diplexer;
   a first port coupled with the first diplexer through the first LPF;
   a second LPF corresponding commonly to the second and third frequency bands, being coupled to the second diplexer;
   a second port coupled with the second diplexer through the second LPF;
   first, second, and third surface acoustic wave (SAW) filters passing the fourth, fifth, and sixth frequency bands included in the second frequency band group;
   third, fourth and fifth ports coupled with the second diplexer through the first, second, and third SAW filters, respectively;
   a phase shifter for dividing the fifth and sixth frequency bands disposed between the second diplexer and the second and third SAW filters, respectively;
   a laminated body including a dielectric sheet laminated therein; and
   a diode included in the switch,
   wherein the laminated body includes the switch except the diode, first and second diplexers, first and second LPFs, and phase shifter formed therein, and includes the diode and first, second and third SAW filters mounted thereon.

19. A hybrid RF switching device of claim 18, wherein a frequency in the second and third frequency bands is about twice a frequency in the first frequency band.

20. A hybrid RF switching device of claim 16 or 18, further comprising a chip choke inductor composing a part of the switch, the chip choke inductor being mounted on the laminated body.

21. A hybrid RF switching device of claim 16 or 18, further comprising:
   a grounding electrode formed in the laminated body; and
   via holes coupling the grounding electrode directly with grounding terminals of the SAW filters, respectively.

22. A hybrid RF switching device of claim 21, wherein each grounding terminal is directly coupled with the grounding electrode through a plurality of via holes of the via holes.

* * * * *